March 29, 1960 G. OBOLENSKY 2,930,540

TRANSPORT SYSTEM FOR TAPE RECORDER AND THE LIKE

Filed Sept. 7, 1954

INVENTOR.
GUY OBOLENSKY

BY I. Jordan Kunik
ATTORNEY

United States Patent Office 2,930,540

Patented Mar. 29, 1960

2,930,540

TRANSPORT SYSTEM FOR TAPE RECORDER AND THE LIKE

Guy Obolensky, Yonkers, N.Y., assignor of ten percent to I. Jordan Kunik, New York, N.Y.

Application September 7, 1954, Serial No. 454,533

9 Claims. (Cl. 242—55.12)

Figures 1, 2:
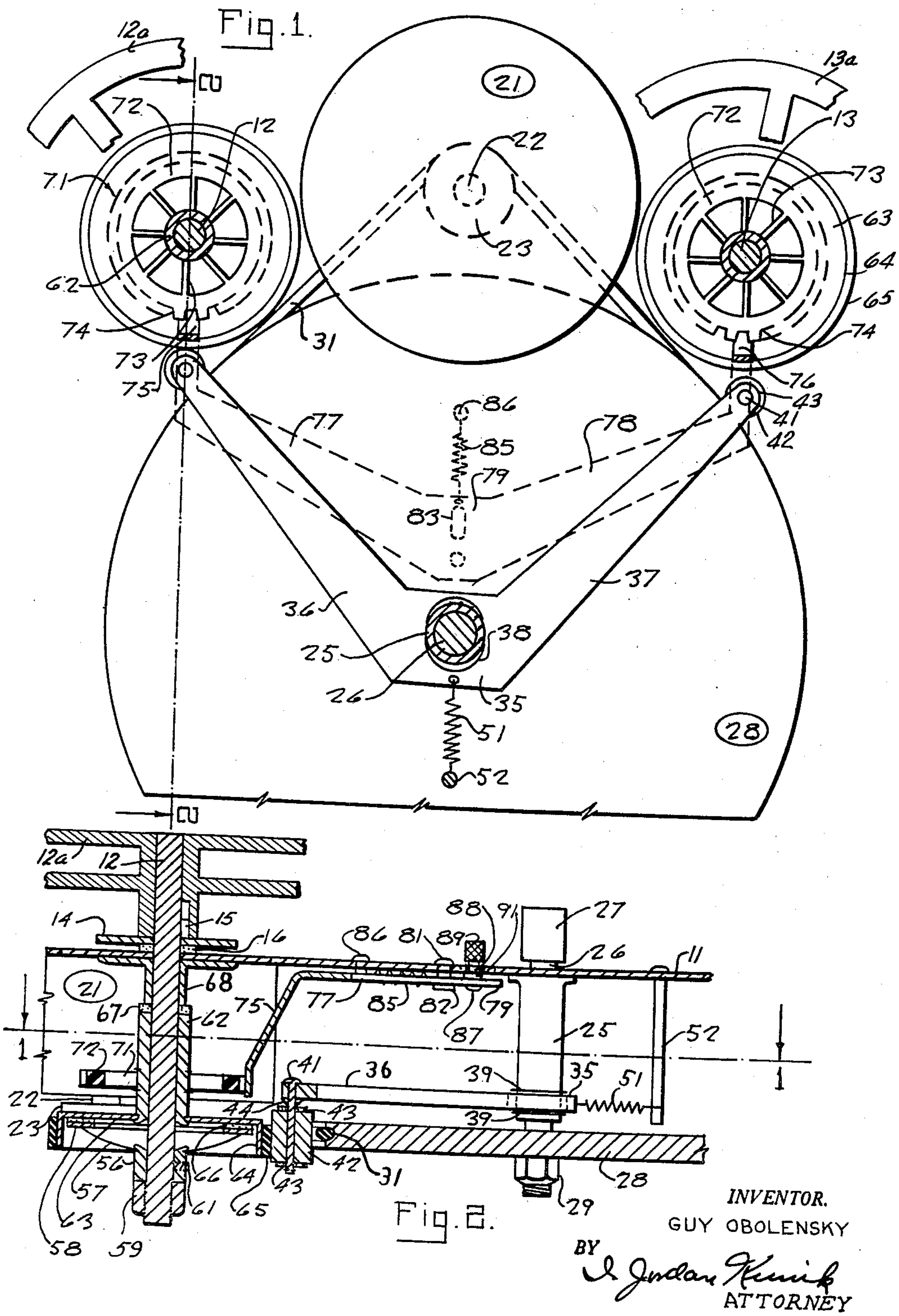

This invention relates to transport systems and more particularly to systems for transporting magnetic tape, movie film and the like in magnetic recorders, film cameras or projectors, and the like.

Although the mechanisms to be described and claimed herein are useful in a variety of machines, the description will be directed, for the sake of simplicity, particularly to magnetic recording and playback machines.

The purpose of the present invention is the provision of a novel transport apparatus and system performing all of the functions of existing expensive and complex machines by means of a reduced number of simple mechanical parts and linkages and having consequently a greatly reduced cost of production.

The apparatus of the present invention comprises a bidirectional system wherein each of two reels is arranged to operate selectively and alternately as a supply or pay-out reel and as a take-up reel, the power source for the rotation of said reels being supplied by a single electrically reversible constant speed motor which is also operative to run the bidirectional metering capstan at constant speed.

The present system and apparatus also provides for a controlled high speed rewind operation wherein means are arranged for stopping the tape relatively quickly at or near a desired point thereon for resumption of recording or playback, and at the same time preventing the tendency of the tape to leave the tracking channel and preventing the accumulation of loose tape. These controlled conditions are accomplished by a combination slip clutch and unidirectional brake system operative upon each reel and automatically selected whereby tension is applied upon the tape passing to the metering capstan from whichever reel is functioning as the supply reel. This system permits the fast moving tape to be rapidly slowed and stopped within an exceedingly short time without subjecting the tape to any deleterious tensions and without the use of complex and expensive mechanisms and linkages. The unidirectional brakes on each of the reels are operative one at a time in opposite directions and since the reels are operative in two directions, a single brake control is provided which is automatically selective of the particular brake that is to function.

The system of the present invention provides also that when the record and playback magnetic heads are positioned between the supply reel and the metering capstan, the latter is able to cause the tape to traverse said heads with maximum stability during record or playback operation with substantially complete elimination of the phenomena of wow and flutter which are manifest in prior systems where the magnetic heads are located between the metering capstan and the power driven take-up reel.

According to my system I apply a load to the tape from the supply reel which is mechanically isolated from the power drive system, the slip clutch automatically accommodating itself to the continually reducing speed of the supply reel while the tape speed remains constant. In other systems where the take-up reel and metering capstan are powered from the same source, it is inevitable that if the requisite tension on the tape for record or playback should be provided between the take-up reel and the capstan, vibrations generated in the take-up reel, its mountings and drive linkages are transmitted to the metering capstan, thereby greatly aggravating the phenomena of wow and flutter on the magnetic tape.

Although some of the problems referred to have been met with in the case of some machines that have one set of magnetic heads, and operate unidirectionally with a unidirectional metering capstan, it is necessary to transfer the supply reel in order to record or play back information on a second channel on the tape. With my system, however, where the metering capstan operates in either direction and the two reels are operative selectively, either as supply reels or take-up reels, I provide two sets of record and playback magnetic heads, a set of heads being positioned between the capstan and each of the respective reels. One set of magnetic heads is positioned to record or play back a channel on the tape spaced apart from a second channel that is magnetically coupled to the other set of heads. Thus, one channel of information is recorded or played back in one direction when the tape traverses from left to right and another channel is recorded or played back in the opposite direction when the tape traverses from right to left. Hence, with the provision of appropriate switching mechanisms, my machine can recycle automatically and play continuously on the alternate channels. When the end of recording or playback of one channel of the tape is reached, the bidirectional power system of the machine may be caused to reverse its direction, the previously operative magnetic head is automatically deactivated while the other magnetic head is automatically activated, and information on the other channel will then be recorded or reproduced.

In sum, the transport mechanism of the present invention provides a novel drive system, a novel brake and clutch system and a novel tape feed tension system, the realization of which is accomplished by a combination of simple, low cost elements which are operative selectively in either direction of the tape traverse.

Still other features and advantages of my invention will be apparent from the specification.

The features of novelty which I believe to be characteristic of my invention are set forth herein and will best be understood, both as to their fundamental principles and as to their particular embodiments, by reference to the specification and accompanying drawings, in which:

Figure 1 is a diagrammatic plan view of the transport elements, some of which are shown in section taken on line 1—1 of Fig. 2; some parts being broken away, some parts being shown in phantom outline and some parts being omitted; and Fig. 2 is a section view taken on line 2—2 of Fig. 1, some parts being shown in elevation, some parts being broken away and some parts being omitted.

The diagrammatic drawing herein shows only those specific structures which are claimed to be novel and omits other parts of magnetic tape recording devices or film transport apparatus which are well known in the art.

Referring now to Figs. 1 and 2 of the drawings in detail, and describing the features of the invention with specific reference to a magnetic tape recording and playback apparatus, there is shown a portion of a horizontal mounting plate 11 in which there is arranged a pair of spaced apart vertical rotatable reel shafts 12 and 13. It is to be understood that in other embodiments mounting plate 11 may be positioned vertically or obliquely, as desired or required, with the other elements described herein being rearranged accordingly to accommodate themselves in functional relationship to said plate.

Mounted fast around and rotating with shafts 12 and 13 are disks 14 which serve as a platform for the support of reels **12*a* and 13*a* in which magnetic tape may be wound. There is provided adjacent each disk 14 a radially extending key 15 on the periphery of each shaft 12 and 13, said key being adapted to cooperate with a keyway in said reels for rotating the latter. Disk 14 abuts a stationary thrust bearing 16 on plate 11 against which it rotates and which also serves to space disk 14 apart from the top of mounting plate 11**.

Connected by suitable means to underside of mounting plate 11 is a constant speed electrically reversible motor 21 having a downwardly extending output shaft 22 upon which is mounted pulley 23. A suitable power source and suitable switches (not shown) are provided, as well known in the art, for causing motor 21 to rotate shaft 22 in either clockwise or counterclockwise direction as desired.

Mounted on the underside of plate 11 and spaced substantially equidistantly from shafts 12 and 13 is a vertical cylindrical stationary post 25 through which there extends a rotatable shaft 26, suitable retaining means (not shown) being provided between post 25 and shaft 26 to prevent any vertical longitudinal movement of shaft 26 relative to said post. Such expedient may be provided in the form of a ring on post 25 with which an annular recess in the peripheral surface of shaft 26 cooperates. Other suitable retaining means known to the art may be provided.

Mounted on the top of shaft 26 and rotating therewith is a metering capstan 27 adapted to engage and move the tape from one reel to the other as is well known in the art. Mounted on the bottom of shaft 26 and rotating therewith is a circular flywheel 28 secured thereon by means of threaded bolt 29. Flywheel 28 has a peripheral groove which accommodates drive belt 31 which engages the peripheral groove on drive pulley 23 whereby rotation of pulley 23 causes the rotation of flywheel 28, and accordingly, of shaft 26 and of metering capstan 27, the direction of said rotation being controlled by the direction of rotation of shaft 22 of motor 21.

Pivotally mounted around post 25 is a unitary rigid bell crank 35 having horizontal legs 36 and 37 extending at an oblique angle relative to each other. An aperture 38 is provided in bell crank 35 to permit the free horizontal pivotal movement of said bell crank relative to post 25. A pair of rings 39, or the like, may be provided on post 25 to ensure that all motion of bell crank 35 is limited to the horizontal plane.

Connected to the end of each leg 36 and 37 of bell crank 35 is a downwardly extending fixed pin 41 around which is mounted a rotatable idler roller 42 made of a suitable friction material such as rubber, neoprene or the like.

Although in some embodiments of the present apparatus, roller 42 may be freely rotatable around pin 41, it is preferable to provide a measure of frictional resistance to rotation of roller 42 relative to pin 41 which is overcome at a predetermined threshold of rotational force applied to the periphery of said roller by flywheel 28 for reasons that will be explained hereinafter. Such resistance may be supplied in the form of suitable frictional engagement between the outer periphery of pin 41 and the inside periphery of roller 42.

According to one embodiment shown in Fig. 2, wherein roller 42 is otherwise freely rotatable around pin 41, there is provided a stationary friction pad 43 mounted fast on pin 41 on the bottom and top ends of the roller whose rotation is restrained up to the limit of the frictional coefficient between said roller and said pads. If desired or necessary, additional frictional loading may be provided by a spring member 44 on the underside of legs

36 and 37 which urges top pad 43 downward against the end of roller 42. Pads 43 may be made of steel, rubber, felt, cork or other suitable friction material, depending upon the substance of roller 42.

Connected to the rear of bell crank 35 is one end of spring 51, the other end of which is connected to downwardly extending post 52 connected at its upper end to plate 11. Spring 51 constantly urges bell crank 35 toward post 52 whereby idler rollers 42 are caused to bear against the rim of flywheel 28 by which they are frictionally engaged and rotated. Because of the spring loading on bell crank 35, the rotation of flywheel 28 in either direction will cause the rotation of bell crank 35 in the same direction against the action of spring 51. The limits of rotation of the bell crank will be described and explained hereinafter.

Mounted coaxially near the lower end of each reel shaft 12 and 13 and movable longitudinally relative thereto is a bushing 56 on the upper portion of which is attached a cup-shaped tension spring 57 to the lip of which is attached an annular friction ring 58 made of cork, felt, or other suitable friction material. Spring 57 may be adjusted to the desired tension by means of nut 59 threadably mounted on the lower end of shafts 12 and 13 and adapted to determine the position of bushing 56 which can be set in place by screw 61.

Mounted coaxially around each shaft 12 and 13 and freely rotatable relative thereto is a sleeve bearing 62 on the lower end of which is mounted drive wheel 63 which rotates with said bearing. Drive wheel 63 has a downwardly extending annular collar 64 whose outer periphery is frictionally engaged by idler roller 42. In some embodiments collar 64 may be omitted if the peripheral edge of wheel 63 is adapted to be engaged directly by roller 42. A large frictional area is provided by collar 64, but in the illustrated embodiment a ring 65 of friction material such as rubber, neoprene, cork, or the like, may be mounted around collar 64 for obtaining the desirable frictional properties such materials may possess relative to the substance of roller 42.

Attached to the underside of drive wheel 63 is a friction ring 66 having substantially the same dimensions as friction ring 58 and being made of suitable friction material. As a result of the upward pressure exerted by spring 57, rings 58 and 66 are urged together to form a slip clutch whereby the rotation of drive wheel 63 causes the rotation of shaft 12 or 13, as the case may be, or vice versa until the friction force of said rings is exceeded after which rings 58 and 66 will slip relative to each other. The function of the slip clutches on shafts 12 and 13 will be described hereinbelow.

Since spring 57 exerts upward pressure against drive wheel 63 which is transmitted to bearing 62, the tendency of the latter to move upward is limited by means of thrust bearing 67 which abuts bushing 68 mounted around each shaft 12 and 13 on the underside of plate 11.

Mounted around bearing 62 intermediate its ends is a unidirectional brake generally designated 71, sometimes referred to as an overriding clutch, which is adapted, on the one hand, to lock with bearing 62 when the latter rotates in one direction relative to the brake, and, on the other hand, to permit free movement of said bearing when the latter rotates in the opposite direction.

Any suitable type of unidirectional brake known in the art may be utilized. The embodiment illustrated in the drawing, however, comprises a ring 72 having a plurality of inwardly extending resilient sprags 73, all of which are symmetrically arrayed at a slight angle from their respective imaginary radial lines to the center of said ring, the inner ends of said sprags abutting the peripheral surface of bearing 62.

Referring to the brake on shaft 12 (Fig. 1) it will be observed that when bearing 62 rotates in a clockwise direction, it will move freely with low friction relative to stationary sprags 73 since the latter will slip over the surface of the bearing. When this bearing rotates in the counterclockwise direction, however, sprags 73 will resist any tendency to compress them into a shorter space and hence they will collectively exert a gripping action on the surface of the bearing, locking with the latter and stopping its rotation. Sprags 73 may be made of any suitable material such as steel, nylon or the like.

It will be observed that on the assembly of shaft 13, sprags 73 are arranged in a tangential direction opposite to that of the sprags on the shaft 12 assembly. Here, on shaft 13, the braking and overriding clutch principle is the same, except that the action thereof is operative in the rotational direction opposite that on shaft 12.

In order to render brakes 71 motionless for performing their respective locking or overriding functions, they are each provided with a plurality of uniform notches 74 which are adapted to be engaged simultaneously by downwardly extending pawls 75 and 76 connected to the ends of legs 77 and 78, respectively, of horizontal brake bar 79.

Brake bar 79 is slidably connected to plate 11 by means of stud 81 having a lower flange 82 which supports the bar. A slot 83 is provided in bar 79 around the shank of stud 81 to permit lateral movement for the bar whereby pawls 75 and 76 may be engaged or disengaged from notches 74 on the respective brakes 71.

Unless otherwise provided, pawls 75 and 76 are normally in engagement with notches 74 of both brakes 71 simultaneously under the action of spring 85, one end of which is connected to bar 79 intermediate its ends, and the other end of which is connected to stud 86 mounted in plate 11.

Connected to bar 79 opposite spring 85 is a stud 87 whose upwardly extending shank passes through a slot 88 in plate 11 and on top of which is mounted a knurled knob 89. A ring 91 around stud 87 is provided adjacent bar 79, said ring being adapted to engage an enlarged portion of slot 88 when knob 89 is pulled back against the action of spring 85 and then lifted upward. When bar 79 is thus retracted and locked in position, pawls 75 and 76 are disengaged from both brakes 71. When it is desired to cause the pawls to engage the brakes, knob 89 is merely pushed down and bar 79 is urged forward by the action of spring 85 to cause the pawls to engage both brakes 71. Other suitable mechanical or electromechanical means may be provided for moving brake bar 79 and for locking it in position.

In describing the operation of the apparatus herein, it will be assumed that, in the initial run, shaft 12 will carry the take-up reel 12*a* for receiving magnetic tape from the metering capstan while shaft 13 will carry the supply reel 13*a* paying out tape moving in succession past the recording or playback magnetic head, the capstan and thence to the take-up reel 12*a*.

For recording on or playing back magnetic tape moving from right to left, motor 21 is caused to rotate clockwise, thereby causing flywheel 28 to rotate clockwise. The spring loading on rotatable bell crank 35 causes idler rollers 42 to bear against the rim of flywheel 28 thereby causing the rollers to follow the rotation of said flywheel. It will be noted that the substance of the rim of the flywheel and of the idler rollers 42 are selected to provide the requisite coefficient of friction for rotating said rollers against the friction loading imposed by pressure pads 43.

In some cases idler rollers 42 may be made of steel or the like in which case the rim of flywheel 28 may be made of a resilient material such as rubber, neoprene or the like. In another embodiment belt 31 will ride in a comparatively shallow peripheral groove in flywheel 28 whereby a portion of the belt extends beyond the peripheral edge of the wheel. Thus, when the idler roller is swung around to be in a driving position for the take-up reel 12*a*, it will be engaged frictionally and will be rotated by the outer periphery of the belt which would be made of a resilient material such as rubber, neoprene or the like. Vertical pins 41 serve to provide the requisite bearing action for rollers 42.

The clockwise rotation of bell crank 35 causes left idler roller 42 to approach left drive wheel 63 and impinge upon its friction ring 65 while at the same time the right idler roller moves away out of contact from the right drive wheel which is now effectively isolated mechanically from the transport system.

The spring loading on bell crank 35 is sufficient to overcome the frictional resistance imposed by pressure pads 43 and idler rollers 42 are rotated counterclockwise by flywheel 28; and since the left idler roller has frictionally engaged friction ring 65 of left drive wheel 63 the latter will be rotated clockwise. The reason for the friction loading by pressure pads 43 upon idler roller 42 now becomes apparent since its function is to ensure and stabilize the engagement of said roller with the operative periphery of drive wheel 63. If this friction loading were absent, it would require relatively little energy to move roller 42 out of engagement between flywheel 28 and drive wheel 63 and there would be a tendency for the idler roller to bounce upon striking the resilient frictional surface of the drive wheel. The friction loading on idler rollers 42 by the pressure pads also ensures the stability and reliability of the entire bell crank arrangement. The spring loading of bell crank 35 which in turn provides frictional engagement of the two idler rollers against the periphery of the flywheel assures that the idler rollers will be caused to move positively and will not slip or bounce even though they are restrained somewhat by the friction loading of pads 43.

The counterclockwise rotation of left idler roller 42 causes the clockwise rotation of left drive wheel 63 which, by means of the clutch formed by rings 66 and 58, in turn causes shaft 12 and accordingly its tape reel 12*a* to rotate clockwise to take up tape.

It must be noted that for record or playback functions, both unidirectional brakes 71 are simultaneously immobilized by pawls 75 and 76, respectively. Since sprags 73 of left brake 71 impose no restraint upon the clockwise rotation of left bearing 62, an overriding condition exists and said bearing rotates freely with the clockwise rotation of drive wheel 63 to which it is connected.

It is to be noted that there is a constant increase in the diameter of the mass of tape being wound on the take-up reel 12*a* on shaft 12, while said tape is moving at a constant linear speed as controlled by the constant speed metering capstan. Also the left drive wheel 63 is being rotated at constant speed from the constant speed source, motor 21, through the transmission comprising flywheel 28 and left idler roller 42. The peripheral velocity of the tape accumulating on take-up reel 12*a* must remain constant, in order not to interfere with the function of the metering capstan. Hence, the angular velocity of take-up reel 12*a* and, accordingly, that of shaft 12 must diminish under controlled conditions without undue strain being imposed upon the tape should reel 12*a* rotate too fast, and without permitting the tape to spill past said reel should the latter rotate too slowly.

The requisite controlled conditions are realized by the provision of the slip clutch comprising rings 58 and 66 which absorb any differential of excess power exerted by the constant speed source over that required to rotate shaft 12 at diminishing speed. In other words, the slip clutch differentiates between the constant speed of the power supply and the diminishing speed of the driven member. Essentially, the slip clutch serves to convert constant speed to constant torque at any speed up to the maximum speed of the driven member. While friction ring 66 rotates rapidly at a constant speed, friction ring 58 will decelerate as tape is loaded on to take-up reel 12*a*.

Although a gradually increasing slippage takes place between friction rings 58 and 66, the clutching action persists to the extent that the movement of the tape onto take-up reel 12a permits the latter to rotate. Complete slippage between the friction rings would occur if the tape movement were stopped, thereby causing take-up reel 12a to stop, while ring 66, drive wheel 63 and bearing 62 continue to rotate without effect. The slippage friction factor of the clutch is controlled by adjusting the tension on spring 57 to a degree determined by the tension characteristics of the tape and other operating considerations.

The operating conditions of the assembly on shaft 13 will now be considered relative to record or play back functions of the machine with the tape moving from right to left. A supply reel 13a of tape is mounted upon shaft 13 with which it rotates clockwise. It will be remembered that the assembly on shaft 13 is mechanically isolated from flywheel 28 since bell crank 35 has rotated clockwise moving the right idler roller 42 out of engagement with the right drive wheel 63. It must also be remembered that right brake 71 is immobilized by pawl 76.

Tape is drawn at a constant linear speed from supply reel 13a on shaft 13 and past the record or play back magnetic head by the action of the metering capstan. During this operation it is advantageous to impose adequate tension upon the tape so that the latter traverses the magnetic head positioned between supply reel 13a and the capstan with maximum stability of tracking whereby the phenomena of wow and flutter are substantially eliminated.

The requisite tension upon the tape passing from supply reel 13a is provided by means of the slip clutch friction loading assembly on shaft 13 which is identical to that on shaft 12. This loading is automatically at hand since right brake 71 has been immobilized whereby its sprags 73 lock with right bearing 62, preventing the rotation of said bearing and, accordingly, of drive wheel 63 and friction ring 66. Since tape is being pulled from supply reel 13a on shaft 13, the latter rotates, causing its spring 57 and friction ring 58 to rotate clockwise. The cooperation of friction rings 58 and 66 serves as a slip clutch to impose the requisite stabilizing load upon the tape passing from the supply reel 13a to the magnetic head.

Since the critical recording or play back conditions obtain in the area of the tape between supply reel 13a and the metering capstan, tension applied to the tape by the system described herein is unaffected by any vibrations that may be generated by the mechanical power supply since the drive assembly on shaft 13 is completely isolated from flywheel 28, the right idler roller 42 having swung out of engagement with right drive wheel 63 which is stationary during these operations.

The loading on the tape passing from supply reel 13a may be controlled by adjusting the tension on spring 57 mounted on shaft 13 to a sufficient degree short of subjecting the tape to any possibility of deterioration or fracture. It is preferable that each slip clutch on shafts 12 and 13 be adjusted to a substantially equal tension, so that after long periods of bidirectional use, the tape does not develop strains in one direction only.

The combination slip-clutch and unidirectional brake system described hereinabove serves also, without structural change, to stop the movement of the tape relatively quickly and with complete safety during high speed rewind operation at or near a desired point from which it is desired to resume recording or playback. This is accomplished by means of the system herein without upsetting the tracking of the tape and without slack accumulating in the tape.

Assuming that it is desired to rewind the tape at high speed from the reel 13a on shaft 13 to the take-up reel 12a on shaft 12, brake bar 79 is retracted thereby disengaging pawls 75 and 76 from the respective unidirectional brakes 71. The tape is also disengaged from the metering capstan and the other mechanisms otherwise in contact therewith and it is now able to pass substantially freely from one reel to the other.

Since no tension is applied to the tape, the take-up reel 12a on shaft 12 rotates at full speed by the action of flywheel 28, through idler roller 42, drive wheel 63 and the slip clutch associated therewith. The slip clutch holds firmly in this operation because the tension upon the tape does not exceed the pressure required to cause the clutch to slip.

As take-up reel 12a is being wound with tape, it applies tension thereon and causes it to unwind at high speed from supply reel 13a, the latter rotating in accordance with the rate at which the tape is being withdrawn. It will be observed that supply reel 13a has no force brought to bear upon it either by the unidirectional brake or by the slip clutch. In other words, supply reel 13a free wheels except for its bearing friction and other stabilizing structures that may be introduced into the system if found desirable to do so.

When it is desired to stop the fast rewind action at a particular point on the tape, brake bar 79 is manipulated so that its pawls simultaneously engage both unidirectional brakes 71 associated with shafts 12 and 13, respectively. In the case of the rapidly rotating take-up reel 12a, no effect is produced directly thereon by this action because the left unidirectional brake 71 is in the overriding condition relative to left bearing 62. In the case of supply reel 13a on shaft 13, however, right unidirectional brake 71 locks with right bearing 62 which stops rotating, and causes its drive wheel 63, isolated from flywheel 28, to stop rotating. Right friction ring 66, now motionless, imposes a friction loading upon right friction ring 58 thereby causing deceleration of the latter and, consequently, of shaft 13 and of supply reel 13a, the loading being arranged to be within safe limits of the tension that may be applied to the tape.

The decelerating tension that now has been imposed upon the tape causes the take-up reel 12a to decelerate also, and since flywheel 28 is still in operative engagement with right drive wheel 63, the clutch on shaft 12 begins to slip and absorbs the excess power imposed by flywheel 28.

Under conditions controlled by both slip clutches on shafts 12 and 13, respectively, the tape decelerates rapidly to a suitably low speed at which time the metering capstan can be caused to engage the tape again to cause it to record or play back on the appropriate magnetic head in the same direction of the previous fast rewind traverse of the tape.

If it is desired to stop the flow of tape completely or reverse its direction, however, suitable switching means may be provided to cooperate with brake bar 79 whereby the manipulation of said bar automatically opens the electrical circuit that operates motor 21, thereby stopping the power transmission to take-up reel 12a on shaft 12. The rapidly decelerated tape will now stop under the action of the clutches mounted on both shafts 12 and 13. This rapid deceleration and stopping will have taken place without applying any deleterious tension upon the tape, while at the same time, the tape is automatically prevented from spilling uncontrollably from supply reel 13a.

The rapid rewind and stopping action may take place at or near an end of the tape in order to remove the reel or to replay or record the tape from beginning. At other times it may be desired to rewind the tape rapidly to a certain predetermined or hunted point intermediate its ends from which point the playback or recording of the tape is resumed in the reverse direction by reversing the direction of motor 21, causing the metering capstan to engage the tape and closing the electrical circuit of the appropriate magnetic head.

Although the operation of the apparatus herein has been described with the assumption that take-up reel 12a was mounted upon shaft 12 and supply reel 13a upon shaft 13, it is obvious that should electrically reversible motor 21 be caused to rotate counterclockwise with the consequent counterclockwise movement of flywheel 28 and bell crank 35, the right idler roller 42 will be caused to engage and rotate drive wheel 63 on shaft 13 in a counterclockwise direction whereby reel 13a mounted upon the latter will serve as a take-up reel, while reel 12a mounted upon shaft 12 will now serve as the supply reel. This is accomplished by the utilization of identical parts on each reel shaft assembly with the exception that the identical unidirectional brakes 71 are arranged to be operative in opposite directions on the respective shafts 12 and 13. This truly bidirectional transport system is extremely flexible and simple to operate and is achieved by the utilization of a single reversible power source, and a pair of unidirectional brakes operating in conjunction with respective slip clutches. The provision of this simple and inexpensive combination of unidirectional brake and slip clutch structure ensures the proper and safe tension conditions operative upon the tape during recording or playback, during fast rewind, and for rapid deceleration and stopping during fast rewind.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain preferred embodiments of my invention, it will be understood that modifications and changes may be made without departing from the function and scope thereof, as will be clear to those skilled in the art.

I claim:

1. A tape transport system comprising a constant speed bidirectional motor, a pair of spaced apart shafts each adapted to carry and rotate a reel for passing tape from one to the other, means between said motor and each of said shafts to selectively rotate either one of said shafts depending upon the selected direction of rotation of said motor, said selected shaft carrying the take-up reel and the other of said shafts carrying the pay-out reel, a two-element friction slip clutch on each shaft, one of said elements being engaged by said selecting means, a unidirectional brake connected to said element of each slip clutch, said unidirectional brakes having braking actions in opposite directions in respect of each other, each brake being operative to immobilize its respective clutch element only when its respective shaft is rotated by the pay-out reel, the brake associated with the take-up reel being in overriding non-braking condition, and a brake engaging member normally engaging both of said brakes simultaneously during the operation of the tape transport system, said brake engaging member being retractable out of engagement with both said brakes to permit rapid rewind of the reels.

2. A transport system comprising a pair of spaced apart shafts each adapted to rotate a reel for passing tape from either reel to the other, both of said shafts normally rotating clockwise when the tape passes in one direction and rotating counter-clockwise when the tape passes in the opposite direction, a sleeve mounted coaxially around each of said shafts and rotatable independently thereof, a drive wheel mounted fast on each sleeve, a friction clutch connecting each wheel with its respective shaft, a unidirectional brake mounted around each sleeve, each brake when immobilized being operative to substantially lock its respective sleeve against the action of its respective clutch when its respective shaft rotates in one direction and said brake being in an overriding condition to permit the rotation of its respective sleeve under the action of its respective clutch when its respective shaft rotates in the opposite direction, one of said brakes providing its locking and overriding actions in respective directions opposite to those provided by the other brake.

3. A system according to claim 2, and further comprising a rotatable fly wheel, a unitary bell crank pivotally mounted near said fly wheel, a roller on each end of said bell crank extending over the periphery of said fly wheel, unitary biasing means connected to said bell crank and operative to cause both of said rollers to be urged simultaneously against the periphery of the fly wheel, the rotation of said fly wheel in one direction causing one of said rollers to engage and rotate one of said drive wheels only, the rotation of said fly wheel in the opposite direction causing the other of said rollers to engage and rotate the other of said drive wheels only.

4. A transport system according to claim 3, and further comprising a friction element on each of said rollers, said friction element producing partial resistance to rotation of said rollers when either of them is in rotational engagement between said fly wheel and a respective drive wheel.

5. A transport system according to claim 4, and further comprising a bidirectional motor, belt and pulley means connecting said motor to said fly wheel to rotate the latter in either of two directions.

6. A transport system according to claim 5, and further comprising an annular recess in the periphery of said fly wheel to accommodate said belt.

7. A transport system comprising a constant speed bidirectional drive means, a pair of shafts each adapted to carry and rotate a reel for passing tape from either reel to the other, means between said drive and each of said reels adapted selectively to engage and impart positive rotation to either one of said reels at a time, a friction clutch on each of said shafts, each clutch being engageable by said selective engaging means, the clutch on whichever shaft is being engaged and rotated positively being adapted to absorb energy generated as a result of the difference between the constant speed drive means and the decelerating speed of rotation of said shaft as it is being loaded with tape, a unidirectional brake on each shaft connected to the respective clutches, and single means operative to engage both brakes simultaneously during operation of said system in either direction, each unidirectional brake being selectively operative to engage its respective clutch to impose partial resistance to rotation of said respective shaft only when its respective reel is being unwound.

8. A transport system comprising a pair of spaced apart rotatable shafts, a fly wheel, drive means for rotating said fly wheel in two directions, a unitary rigid bell crank pivotally mounted near said fly wheel, a roller on each end of said bell crank extending over the periphery of said fly wheel, unitary spring means connected only to a central portion of said bell crank and operative to cause both of said rollers to be urged simultaneously against the periphery of the fly wheel, the movement of said periphery in one direction causing said rollers to move and said bell crank to rotate in the same direction whereby only one of said rollers is brought into engagement with only one of said shafts and said roller rotates by the action of said fly wheel to cause the rotation of said shaft, and the movement of said periphery in the opposite direction causing said rollers to move and said bell crank to rotate in said opposite direction whereby only the other of said rollers is brought into engagement with only the other of said shafts and said other roller rotates by the action of said fly wheel to cause rotation of said other shaft, a reel mounted on and rotated by each of said shafts, said reels being arranged to pass tape from one to the other in either direction depending upon which shaft is given positive rotation by a respective roller to cause its reel to take up tape while the other shaft and other reel rotate passively to pay out tape, a two element friction clutch on each of said shafts, the first of said elements being mounted fast on its respective shaft, the other element being engaged by a respective roller to cause the positive rotation only of the shaft carrying the take up reel, a unidirectional brake connected to each of said first friction elements, the brake on the shaft carrying the take-up reel being in the overriding condition and the brake on the shaft of the payout reel being in the active braking condition to impose partial resistance of rotation to the passively rotating shaft, and a brake engaging member normally engaging both of said brakes simultaneously during the operation of said system in either tape transporting direction.

9. A transport system according to claim 8, and further comprising biasing means for normally urging said brake engaging member into operative engagement with both of said brakes simultaneously, said biasing means being operable to retract said brake engaging members from both brakes simultaneously to permit rapid rewind of said reels.

References Cited in the file of this patent

UNITED STATES PATENTS

| | | |
|---|---|---|
| 1,877,789 | Barrett | Sept. 20, 1932 |
| 2,438,222 | Lear | Mar. 23, 1948 |
| 2,555,643 | Harrison | June 5, 1951 |
| 2,686,637 | Dashiell et al. | Aug. 17, 1954 |

FOREIGN PATENTS

| | | |
|---|---|---|
| 757,466 | France | Oct. 9, 1933 |